Dec. 13, 1966   R. GRAY ET AL   3,291,285
CONVEYING OF PARTICULATE MATERIAL

Filed June 25, 1965                                    2 Sheets-Sheet 1

Inventors
Ronald Gray
David G. Jenkins
By Stevens Davis Miller & Mosher
Attorneys Inventors
Ronald Gray
David G. Jenkins
By Stevens Davis Miller & Mosher
Attorneys

United States Patent Office 3,291,285
Patented Dec. 13, 1966

3,291,285
CONVEYING OF PARTICULATE MATERIAL
Ronald Gray, Birtley, England, and David Gruffydd Jenkins, Cardiff, Wales, assignors to Coal Industry (Patents) Limited, London, England
Filed June 25, 1965, Ser. No. 467,008
Claims priority, application Great Britain, June 30, 1964, 26,998/64
4 Claims. (Cl. 198—161)

This invention relates to the conveying of particulate material. It is often necessary to spread particulate material in a relatively thin layer, for example less than ½" deep along a moving conveyor. When the material is damp it has been found difficult to spread the material along the conveyor.

It is an object of the present invention to provide a method and apparatus for spreading damp material along a conveyor.

According to the invention there is provided a method of spreading particulate material delivered onto a moving conveyor into a layer of predetermined depth, wherein the material is screeded by reciprocating a screeding element towards and away from the conveyor at such a rate relative to conveyor speed that material moved beneath the element whilst the latter moves away from the conveyor is engaged and screeded by the element on its return movement toward the conveyor.

According to the invention there is provided apparatus for spreading particulate material delivered to a moving conveyor into a layer of a predetermined depth, the apparatus comprising an element adapted to screed material on the conveyor to a predetermined depth, and means for reciprocating the element away from and towards the conveyor at such a rate of reciprocation relative to conveyor speed that material moved beneath the element whilst the latter is moving away from the conveyor is screeded by the element during its movement towards the conveyor.

Conveniently the element includes a blade for screeding the material on the conveyor.

Preferably when a blade is used the working edge of the blade is bevelled on the upstream side of the blade with respect to the conveyor travel, so that excess material arising from the screeding is moved in the opposite direction to the direction of conveyor movement.

Conveniently the blade or like element is resiliently mounted so that the blade is able automatically to lift to allow oversize particles of the material (particles with a height greater than the required depth of the layer) to pass the blade.

Further features of the invention will appear from the accompanying drawings, in which.

Figure 1:
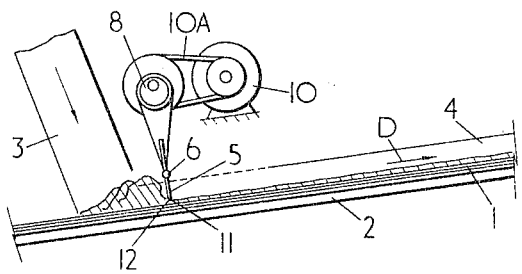
FIGURE 1 is a schematic side view of a material spreader apparatus.

In FIGURE 1 a conveyor having a steel belt 1 is mounted on suitable supports 2. A chute 3 is arranged to feed material to be spread onto the conveyor belt 1, the chute depositing the material in a heap onto the conveyor belt. A loading guide 4 is provided along each side of the conveyor belt 1 in the vicinity of chute 3. A blade 5 is slidably mounted in slide blocks 6 pivotably mounted in a framework.

An eccentric 8 is mounted on a shaft 9 carried on the framework 7. The eccentric receives drive from a motor 10.

In operation the eccentric causes the blade to undergo a reciprocating movement with respect to the belt 1. By virtue of the combined slidable and pivotable mounting of the blade, the working edge of the blade adjacent the belt undergoes an elliptical motion.

Material fed on to the belt 1 is drawn by the belt in the direction of the arrow D towards the blade 5. When the blade is moved away from the belt to leave a small gap between blade edge 11 and the belt 1, a small quantity of the material is able to pass beneath the blade edge. Whilst the material is located beneath the blade edge, the eccentric drive of the blade moves the latter back towards the belt. The edge 11 contacts the material immediately beneath same and reduces the thickness of this material to a predetermined amount. Excess material is pushed back towards the heap. This action is enhanced by bevelling the blade (as indicated at 12) edge rearwardly, with respect to the direction of conveyor movement.

On the next upward stroke of the blade a further quantity of material is moved beneath the blade 5 to be levelled by the blade on its next following down stroke. Consequently the material from the heap is progressively spread in the longitudinal direction of the conveyor as a thin layer whose depth is determined by the setting of the blade relative to the belt.

It will be appreciated that in order to avoid material passing beneath the blade without being screeded and to obtain a continuous stream of material along the conveyor belt it is necessary to correlate the speed of the conveyor belt 1 with the rate of reciprocation of the blade and the setting of the blade relative to the conveyor, so that all layers of material passing beneath the blade are contacted by the blade during its downward movement.

Figure 2:
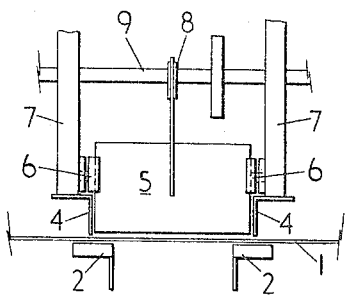
FIGURE 2 is a schematic end view of FIGURE 1.
Figure 3:
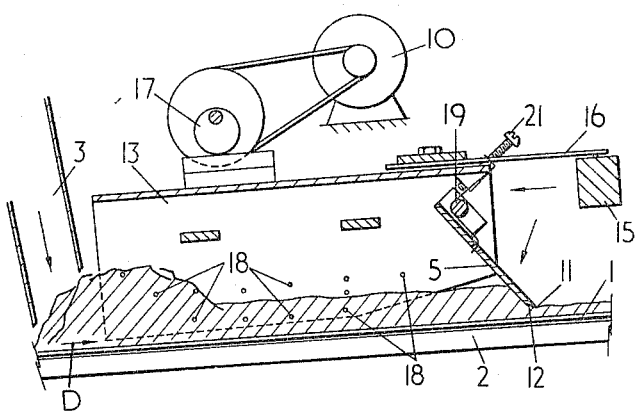
FIGURE 3 is a sectional view of FIGURE 4 of a modified construction of a material spreader apparatus.
Figure 4:
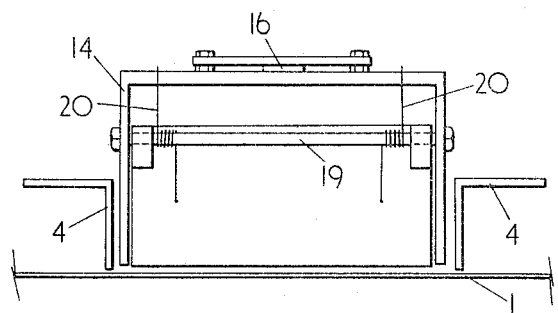
FIGURE 4 is a schematic end view of the apparatus of FIGURE 3.

In FIGURES 3 and 4 parts similar to those used in FIGURES 1 and 2 are identified by the same reference numbers. The chute 3 is arranged to deposit the material to be levelled at the mouth of a box like unit 13 which includes an inverted trough 14 supported from a transverse bar 15 by means of a flexible spring strip 16. The strip biassing the trough upwards away from the belt 1.

A cam 17 driven from the motor 10 is arranged to push the trough 14 towards the belt once during each cam revolution, the biassing of the spring 16 automatically returns the trough away from the belt.

The trough is bridged by a plurality of stretched wires 18 which are so positioned with respect to the direction of the conveyor belt that they engage with the material fed from the chute 3 onto the conveyor belt 1 so as continuously to stir or agitate the material during the reciprocation of the trough.

In this embodiment the blade 5 is pivotably mounted upon a shaft 19 mounted in the trough. The blade 5 is resiliently loaded by springs 20 towards the belt. As will be seen from the drawing the blade is so inclined to the vertical, that it tends to restrict the flow of the material moving with the conveyor in the direction of the arrow D in such manner that material not passing beneath the blade is pushed back towards the material heaped at the base of the chute.

In operation, the cam 17 causes the trough 14 to undergo a reciprocatory movement relative to the conveyor belt. On movement towards the conveyor the wires 18 are moved in the first sense, and on movement from the conveyor the wires 18 are moved in the opposite sense. This movement of the wires through the material stops the latter from packing or settling into a dense mass.

Simultaneously with the movement of the trough 14 the blade 5 is moved relative to the belt 1. Whilst the blade is away from the belt a layer of material is able to pass beneath the working edge 11 of the blade. On the return movement of the blade the depth of material located between the blade and the belt is reduced to a predetermined level, excess material being pushed back towards the chute side of the blade.

By reason of the spring mounting of the trough and thus the blade, the trough and blade can move upwards to pass any oversize pieces to be levelled.

It has been found possible to produce a very thin layer of material upon the conveyor.

The position of the blade 5 relative to the trough 14 can be adjusted by a stop screw 21.

Figure 5:
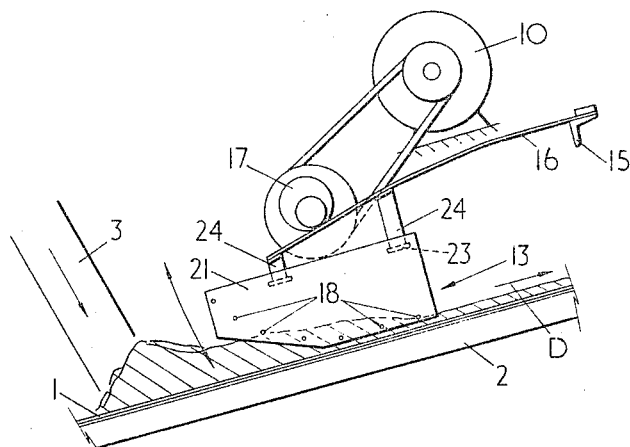
FIGURE 5 is a schematic side view of an alternative construction of a material spreader apparatus.
Figure 6:
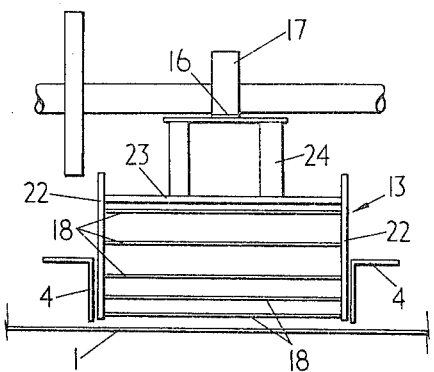
FIGURE 6 is a schematic end view of the apparatus of FIGURE 5.

In the embodiment of FIGURES 5 and 6 parts similar to those used in the preceding figures are identified by the same reference numbers. In FIGURES 5 and 6 the chute 3 feeds the material to be levelled onto the conveyor 1, at the mouth of the unit 13. The unit 13 comprises two parallel side walls 22 rigidly interconnected by cross-pieces 23. The unit 13 is supported from the transverse bar 15 by the blade spring 16 by way of rigid and lengthwise adjustable limbs 24. The unit 13 is reciprocated relative to the belt 1 by the cam 17 driven from the motor 10. The bar 15 is located above the level of the unit 13 thereby ensuring that the direction of the reciprocatory movement of the unit 13 is not perpendicular to the belt 1 but is inclined towards the feed chute 9.

The wires 18 which are stretched between the side walls are arranged as shown with the wire nearest to the feed chute positioned furtherest away from the belt 1, and the wires 18 furthest from the feed chute located nearest to the belt. The wires intermediate the two end wires lying upon a smooth curve.

The apparatus of FIGURES 5 and 6 operates as follows: the material to be spread (e.g. fine wet coal) is fed down the chute to form a heap on the belt 1. This heap is carried by the belt 2 between the side walls 22. The wires 18, during the oscillation of the unit 13 come into contact with the heap. The wires 18 cut into the heap and agitate and break-away any caked material. As the heap is progressively fed between the plates the heaped material moves into contact with the wires 18 nearer to the belt 1 and excess material is forced between the wires 18. Due to the inclined locus of reciprocation surplus material (i.e. that which is forced between the wires rather than between the wires and belt) is thrown back towards the feed chute 13, this material being admixed with the further material delivered by the chute.

Thus the coal is progressively metered to the wires, that are nearest the support 15 and is thus spread out into a thin layer. The thickness of the layer depends upon the length of the stroke of reciprocation and the distance between the wires nearest to the belt at the instant at which the unit 13 is closest to the belt.

In this embodiment the arrangement and relative positioning of the wires 18 in conjunction with the oscillatory movement of the unit 13 renders the use of a blade unnecessary, and for this reason the blade is not used in the embodiment of FIGURES 5 and 6.

We claim:
1. Apparatus for spreading particulate material on a moving conveyor into a layer of a predetermined thickness, the apparatus comprising means for screeding material on the conveyor to a required depth, the screeding means comprising a plurality of wires arranged transversely of the direction of conveyor travel, means for supporting the wires so that they form at least one line of wires, and means for mounting the supporting means for movement towards and away from the conveyor, the mounting means being such that said line extends along the direction of conveyor travel; and said apparatus further comprising means for reciprocating at a predetermined rate the screeding means towards and away from the conveyor.

2. Apparatus as claimed in claim 1, in which the wires are so positioned in the support means that they form a single curved line.

3. Apparatus as claimed in claim 1, in which the mounting means includes a spring means which connects the wire support means to a supporting framework, and the reciprocating means comprises a cam arrangement which co-acts with the spring means to produce reciprocatory movements thereof.

4. Apparatus as claimed in claim 1, and further comprising a blade having a working edge extending lengthwise of the wires, the blade being pivotally mounted in the support means in such position as to co-act with said material after it has been screeded by the wires.

References Cited by the Examiner

UNITED STATES PATENTS

| | | | |
|---|---|---|---|
| 239,216 | 3/1881 | Bayley | 198—166 |
| 1,196,070 | 8/1916 | Jensen | 198—166 |
| 3,062,355 | 11/1962 | Sawada | 222—55 |
| 3,067,855 | 12/1962 | Lambert | 198—37 |

EVON C. BLUNK, *Primary Examiner.*

RICHARD E. AEGERTER, *Examiner.*